US012172401B2

(12) United States Patent
Consoli et al.

(10) Patent No.: US 12,172,401 B2
(45) Date of Patent: Dec. 24, 2024

(54) TABLET PRESS MACHINE

(71) Applicant: I.M.A. INDUSTRIA MACCHINE AUTOMATICHE S.P.A., Ozzano Dell'emilia (IT)

(72) Inventors: Salvatore Fabrizio Consoli, Ozzano Dell'emilia (IT); Marco Corona, Villafontana di Medicina (IT)

(73) Assignee: I.M.A. INDUSTRIA MACCHINE AUTOMATICHE S.P.A., Ozzano Dell'emilia (IT)

( * ) Notice: Subject to any disclaimer, the term of this patent is extended or adjusted under 35 U.S.C. 154(b) by 253 days.

(21) Appl. No.: 17/791,449

(22) PCT Filed: Jan. 7, 2021

(86) PCT No.: PCT/IB2021/050088

§ 371 (c)(1),
(2) Date: Jul. 7, 2022

(87) PCT Pub. No.: WO2021/140455

PCT Pub. Date: Jul. 15, 2021

(65) Prior Publication Data

US 2023/0041286 A1 Feb. 9, 2023

(30) Foreign Application Priority Data

Jan. 8, 2020 (IT) ........................ 102020000000112

(51) Int. Cl.
*B30B 11/08* (2006.01)
*B30B 15/00* (2006.01)
*B30B 15/02* (2006.01)

(52) U.S. Cl.
CPC .......... *B30B 11/08* (2013.01); *B30B 15/0035* (2013.01); *B30B 15/028* (2013.01)

(58) Field of Classification Search
CPC ......... B30B 11/08; B29C 43/08; B29C 43/58; B29C 2043/3618; B29C 2043/3283; B29C 2043/5833; B29C 2043/5883
See application file for complete search history.

(56) References Cited

U.S. PATENT DOCUMENTS 3,861,322 A 1/1975 Danly
4,999,151 A 3/1991 Hinzpeter
(Continued)

FOREIGN PATENT DOCUMENTS

CN 1494477 5/2004
CN 1592681 3/2005
(Continued)

OTHER PUBLICATIONS

Notice of Reasons for Refusal issued Sep. 5, 2023 in corresponding Japanese Application No. 2022-541993 w/English machine translation.

(Continued)

*Primary Examiner* — Thu Khanh T. Nguyen
(74) *Attorney, Agent, or Firm* — Wenderoth, Lind & Ponack, L.L.P.

(57) ABSTRACT

A rotary tablet press machine has a compression turret rotating about a rotation axis and including a die table with dies, lower and upper punches associated in pairs with respective dies, a dosing station for filling dosing cavities formed by the dies closed at the bottom by the lower punches with a product, and a cam device for moving the lower punches inside the respective dies and obtaining settled filling depth. The cam device includes first and second filling cams provided respectively with first and second channels to guide follower ends of the lower punches along a filling path. The machine also has first and second adjustment elements respectively supporting the first and second filling cams. The machine further has a first driving (Continued)

device for moving with respect to compression turret and along a first direction simultaneously the first and second adjustment elements.

15 Claims, 8 Drawing Sheets

(56) References Cited

U.S. PATENT DOCUMENTS

| | | | | |
|---|---|---|---|---|
| 5,698,238 | A | 12/1997 | Fabbri | |
| 5,762,978 | A | 6/1998 | Trebbi | |
| 6,742,646 | B2 | 6/2004 | Sowden et al. | |
| 6,880,694 | B2 | 4/2005 | Sowden | |
| 7,037,456 | B2 | 5/2006 | Grnau et al. | |
| 7,182,199 | B2 | 2/2007 | Sowden et al. | |
| 7,240,785 | B2 | 7/2007 | Sowden | |
| 7,471,992 | B2 | 12/2008 | Schmidt et al. | |
| 7,553,436 | B2 | 6/2009 | Dukler et al. | |
| 7,740,468 | B2 | 6/2010 | Lueneburg et al. | |
| 8,568,630 | B2 | 10/2013 | Herrmann et al. | |
| 2007/0257411 | A1 | 11/2007 | Romer et al. | |
| 2009/0139417 | A1 | 6/2009 | Lueneburg et al. | |
| 2010/0078841 | A1 | 4/2010 | Herrmann et al. | |
| 2011/0024937 | A1* | 2/2011 | Dukler | B30B 11/08<br>264/109 |

FOREIGN PATENT DOCUMENTS

| | | |
|---|---|---|
| CN | 101045340 | 10/2007 |
| CN | 101758233 | 6/2010 |
| CN | 105848845 | 8/2016 |
| CN | 209738366 | 12/2019 |
| DE | 2 344 917 | 9/1973 |
| EP | 1 844 924 | 10/2007 |
| EP | 3 074 202 | 1/2018 |
| JP | 7-21293 | 4/1995 |
| JP | 2003-230990 | 8/2003 |
| JP | 2004-290984 | 10/2004 |
| KR | 20-0174102 | 3/2000 |
| KR | 10-1706727 | 2/2017 |
| WO | 2011/014387 | 2/2011 |

OTHER PUBLICATIONS

International Search Report issued May 7, 2021 in corresponding International Application No. PCT/IB2021/050088.

* cited by examiner

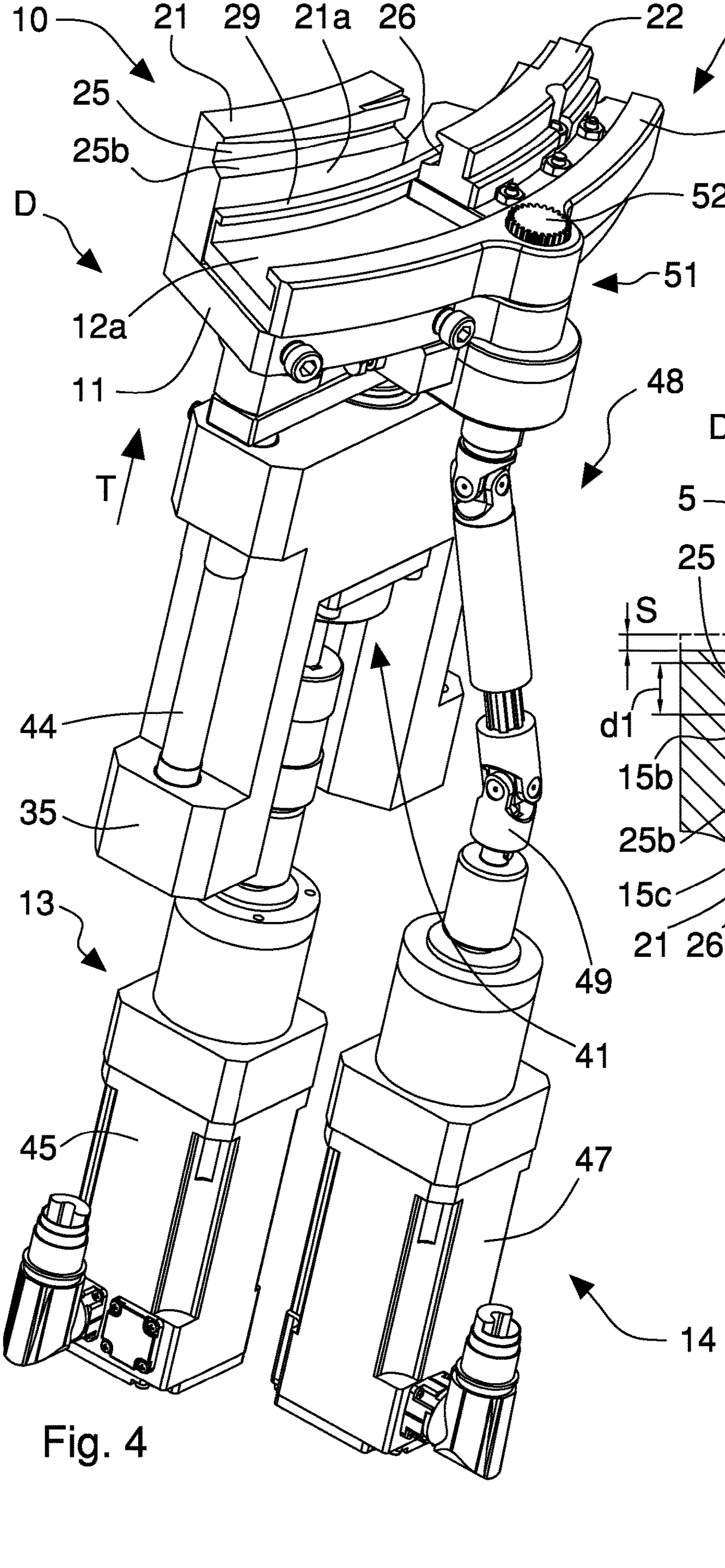
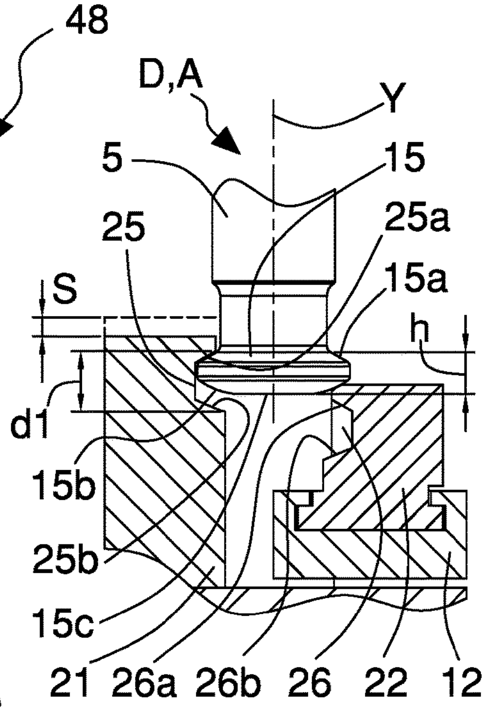
Fig. 3A
Fig. 4

TABLET PRESS MACHINE

The present invention relates to tablet press machines for producing tablets, lozenges, pills, for example for pharmaceutical, cosmetic, food, chemical use, by compressing a powdered or granular product. In particular, the invention relates to a rotary tablet press machine. The known rotary tablet press machines comprise a compression turret, rotating about a vertical axis and formed by a die table or plate provided with a plurality of dies, i.e. through cavities, angularly distributed, equidistant from each other, along a circumferential portion of the table and arranged to receive a powdered or granular product delivered in a suitable dosing station. The turret further comprises a plurality of upper punches and lower punches associated in pairs with the respective dies and moved linearly and vertically, coaxially to the dies, by cams and compression rollers during the rotation of the turret. The cams and compression rollers are in fact connected to a fixed supporting structure of the tablet press machine which also rotatably supports the turret.

The lower punches form with the dies apposite seats or dosing chambers adapted to receive the product in the dosing station where the product is inserted into the dies closed at the bottom by the lower punches. After filling, a scraper in contact with the upper surface of the die table removes the excess dosed product from the dies.

In a successive compression station the upper punches and lower punches are moved by compression rollers to compress the product inserted into the dies so as to create the tablets, which are then extracted from the dies of the table by means of the lower punches, suitably lifted, and then conveyed in an outlet chute.

The various tablet manufacturing steps are performed during one rotation revolution of the compression turret which rotates with continuous motion.

In the dosing station the lower punches are moved by a filling or loading cam so as to form, in the respective die, dosing chambers having a predefined volume which allows to obtain tablets having settled dimensions and weight after the compression. The filling cam is fixed and interchangeable with other filling cams so as to vary the position of the lower punch in the die and thus the volume of the dosing chamber.

The interchangeable filling cams allow to vary in discrete manner, i.e. according to a definite and distinct number, the position of the lower punches and therefore the volume of the dosing chamber within a definite range. Therefore the interchangeable filling cams do not allow an almost continuous adjustment of the volume within such a range.

Indeed, for economic and practical reasons, manufacturers of tablet press machines generally provide as standard equipment a limited number of interchangeable filling cams of different sizes in order to obtain the most common volumes of the dosing chambers, i.e. the size and weight of the tablets.

Discrete variation of a quantity means that between one value and the next there is a set interval, while continuous variation of a quantity means that between one value and the next there are no interval or, in practice, a very small interval.

In order to obtain intermediate and/or more precise adjustments of the volume of the dosing chamber in some tablet press machines, suitable adjustment cams are provided downstream of the filling cams, with reference to the rotation direction of the turret, which allow to modify, in particular reduce, the volume of the dosing chambers by appropriately raising the lower punches to remove the excess product at the end of the dosing step.

A disadvantage of the aforementioned known tablet press machines lies in the fact that the volume adjustment operations of the dosing chambers require the replacement of the filling cams and sometimes of the adjustment cams and are therefore quite complex and laborious, resulting in long stopping times of the tablet press machine and therefore of production. Furthermore, interchangeable filling cams and adjustment cams do not always guarantee to obtain a desired dosage volume, this requiring construction of expensive custom cams.

Finally, the precise adjustment by means of the adjustment cams, since it involves the removal of the excess product from the dies, in some cases is not acceptable to the user of the tablet press machine, who cannot reuse the removed product for producing new tablets (for the risk of possible mixing problems due to density variation within the feeding system), but must discard it, resulting in increased production costs.

An object of the present invention is to improve the known tablet press machines, in particular the rotary tablet press machines having a compression turret provided with dies and upper and lower punches.

Another object is to provide a tablet press machine which allows a volume of dosing chambers, which are formed by dies and lower punches in a dosing station of a product to be compressed, to be adjusted in a simple, fast and precise manner, without manual intervention by operators.

A further object is to produce a tablet press machine which allows an substantially continuous adjustment or variation of the volume of the dosing chambers.

Still another object is to provide a tablet press machine which allows dosing in a precise and accurate manner a product to be compressed inside the dies without the need to remove excess product from the dies at the end of a dosing step.

The invention can be better understood and implemented with reference to the attached drawings which illustrate an exemplary and non-limiting embodiment thereof, in which:

FIG. 3A is an enlarged detail of FIG. 3;

FIG. 4 is a perspective view of the cam means of the dosing station and related driving means;

Figure 1:
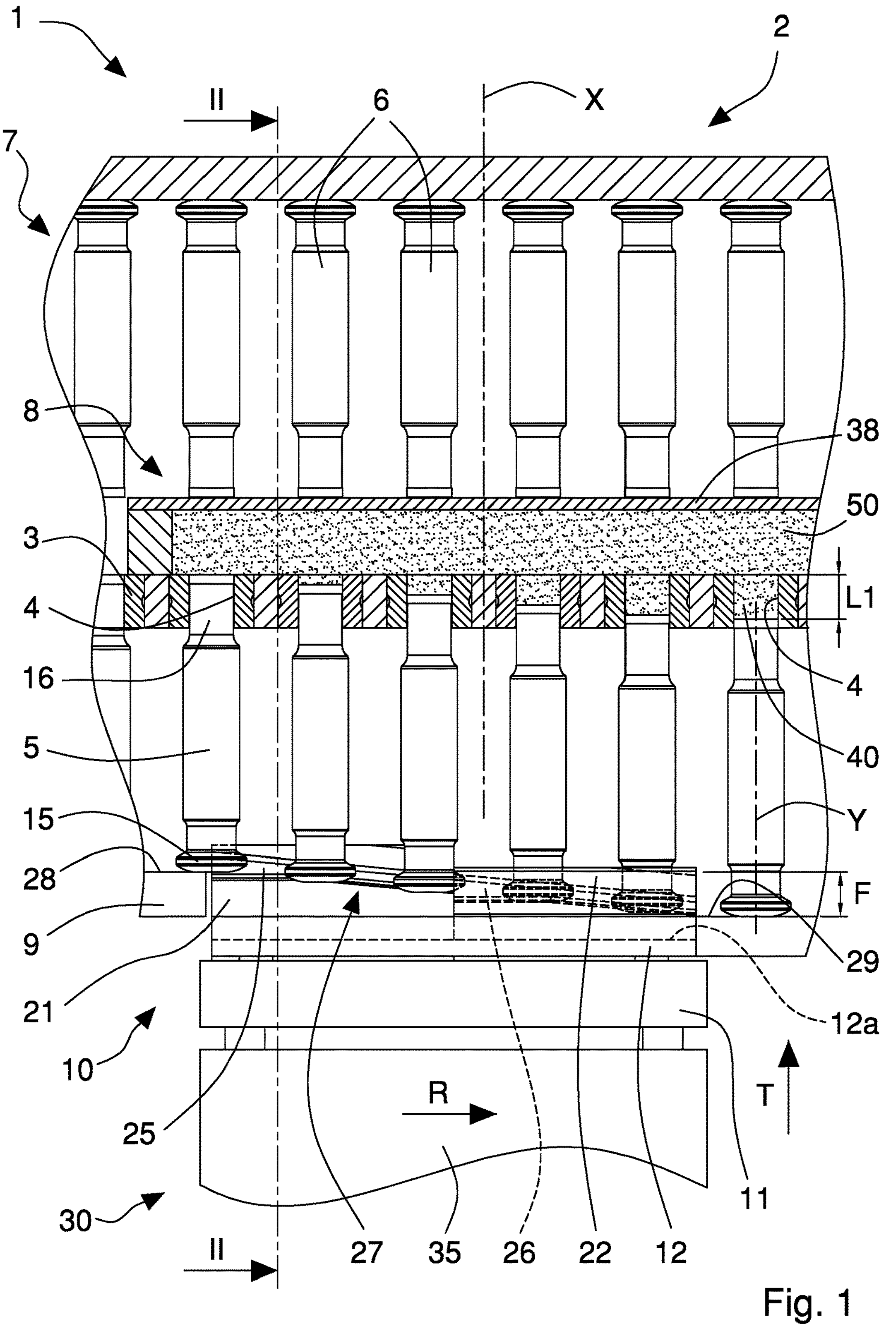
FIG. 1 is a schematic, partial view on a plane of a rotary tablet press machine according to the invention, illustrating in particular a dosing station of a product.
Figures 2, 3:
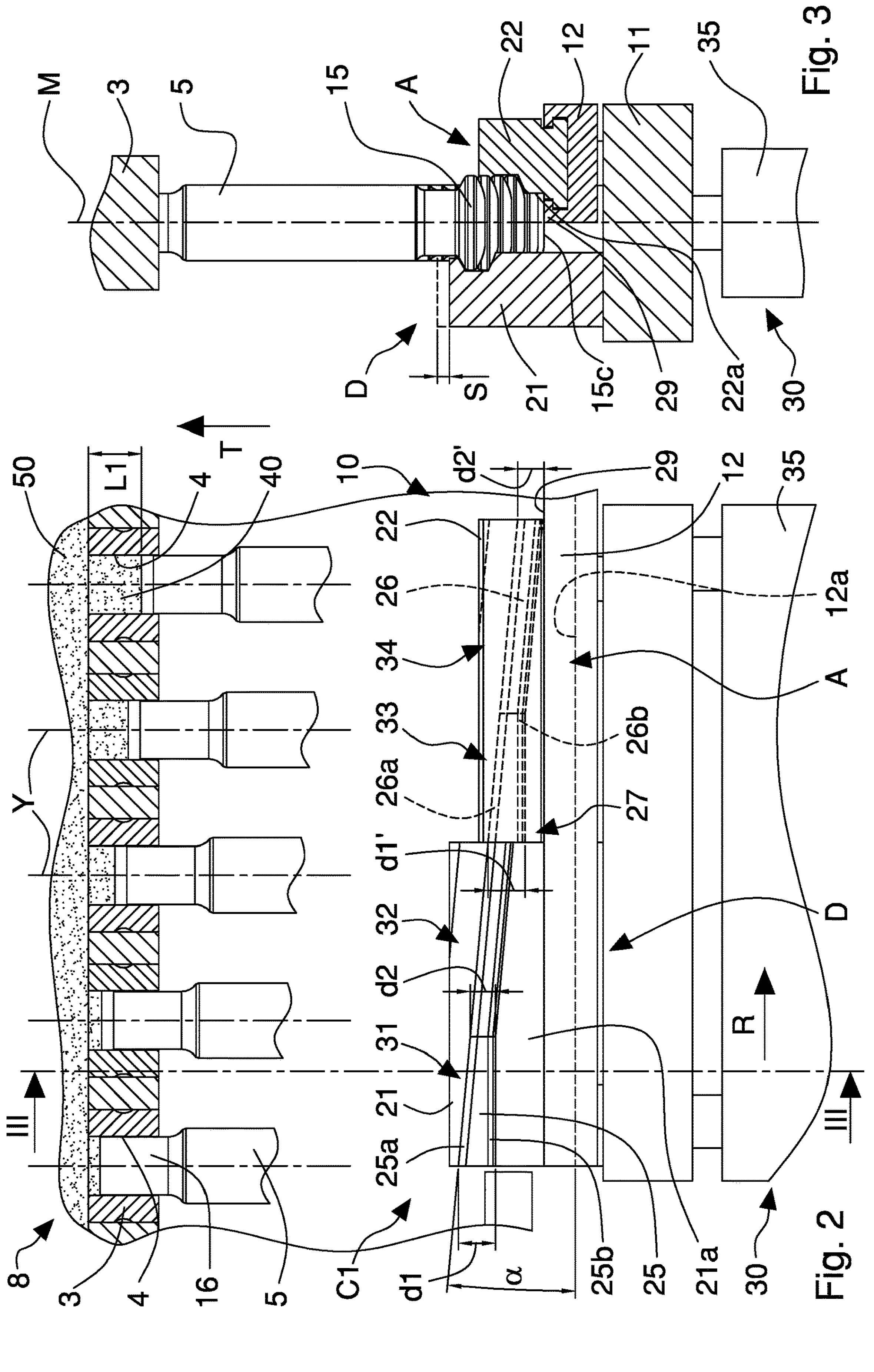
FIG. 2 is an enlarged and partial view of FIG. 1 illustrating lower punches and cam means of the dosing station in a configuration of maximum filling of the product.
FIG. 3 is a section according to the plane III-III of FIG. 2.
Figure 6:
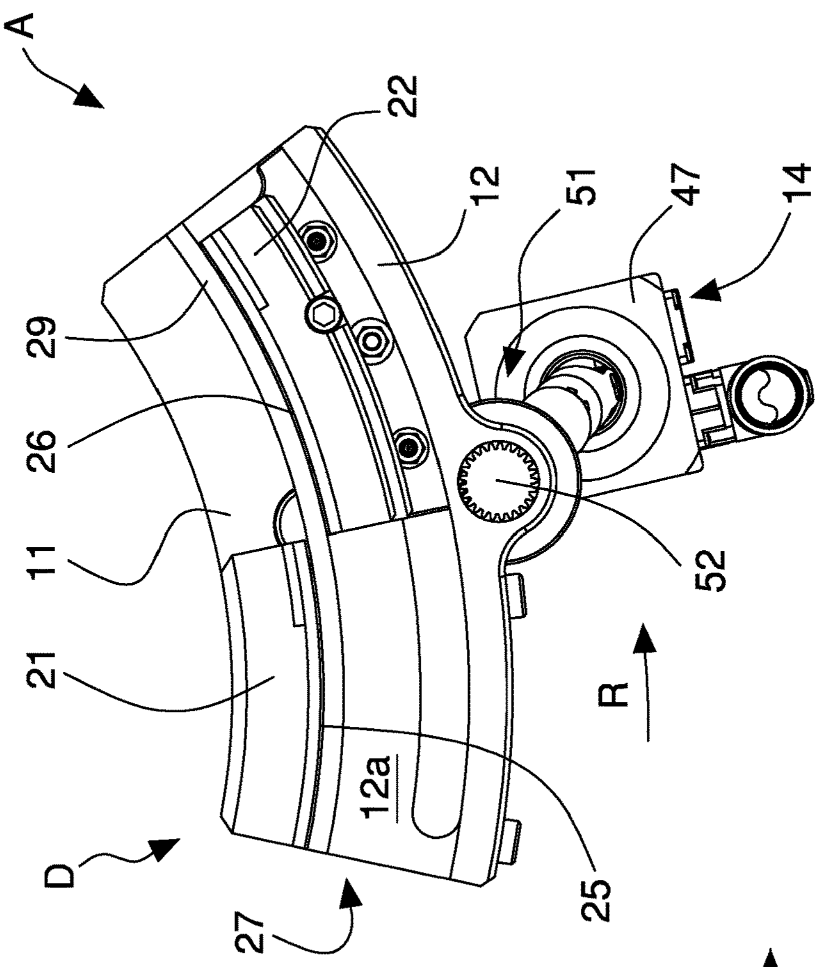
FIGS. 5 and 6 are respectively a front view and a top plan view of the cam means and driving means of FIG. 4.
Figure 5:
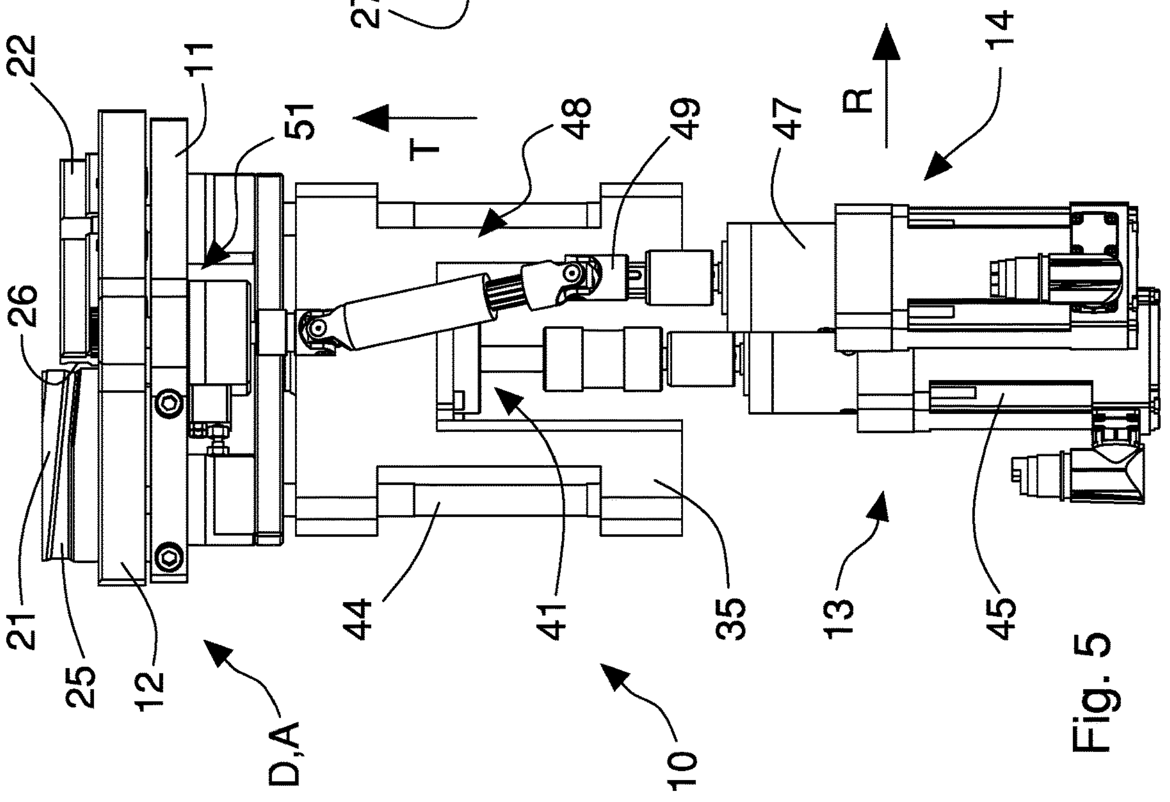

With reference to FIGS. 1 to 6, a rotary tablet press machine 1 according to the invention is illustrated, that is arranged to produce tablets, lozenges, pills by compressing a product 50 in powder or granules for pharmaceutical, cosmetic, food or chemical use.

The tablet press machine 1 comprises a compression turret 2 which is rotatable about an rotation axis X, in particular vertical, according to a rotation direction R and which includes a die table 3, provided along a circumferential portion or edge thereof with a plurality of dies 4, a plurality of lower punches 5 and a corresponding plurality of upper punches 6 associated in pairs with respective dies 4 and movable along a first direction T in order to compress the product 50 inserted into the dies 4 so as to obtain tablets, lozenges or pills.

The dies 4 are through cavities made in the die table 3 that form in cooperation with the punches 5, 6 the seats or housings in which the product 50 is dosed and subsequently compressed to form the tablets 100.

The tablet press machine 1 comprises a dosing station 7 arranged to dispense a fixed amount of product 50 to be compressed inside the dies 4 and at least one compression station, of a known type and not illustrated in the figures, in which the lower punches 5 and the upper punches 6 are linearly moved inside the respective dies 4 to compress the product 50 delivered into the dies 4 so as to obtain the tablets.

The dosing station 7 comprises filling means 8 arranged to fill with the product 50 dosing cavities 40 formed by the dies 4 closed at the bottom by the lower punches 5 and having an settled filling depth L1 and cam means 10 cooperating with the lower punches 5 to move the latter ones inside the respective dies 4 and obtain the settled filling depth L1. Cam means 10 are fixed with respect to the compression turret 2 and are connected to a fixed supporting structure 30 of the tablet press machine 1.

In the illustrated embodiment, the filling means 8 comprise a container 38 containing the product 50 and open on the die table 3 to allow the product 50 to penetrate into the dosing cavities 40 in the respective dies 4.

The depth or height of the dosing cavities 40 increases progressively during the rotation of the compression turret 2 in the rotation direction R, from a substantially zero value, when the dies 4, with the respective upper ends 16 of the lower punches 5 inserted therein, enter the container 38, to a value equal to the settled filling depth L1 when exiting the container 38. Downstream of the container with reference to the rotation direction R of the compression turret 2 a scraper element is provided, of a known type and not illustrated in the figures, which is in sliding contact with an upper surface of the die table 3 in order to remove possible excess product 50 dosed in the dies 4.

The cam means 10 comprise a first filling cam 21 provided with a first channel 25 and a second filling cam 22 provided with a second channel 26, said first channel 25 and said second channel 26 being configured and mutually arranged so as to guide follower ends 15 of the lower punches 5 along a filling path or channel 27 defined by said first and second channel 25, 26. The second channel 26 is opposite the first channel 25 with respect to the lower punches 5.

The tablet press machine 1 further comprises a first adjustment element 11 supporting the first filling cam 21 and a second adjustment element 12 supporting the second filling cam 22, which is mounted on said second adjustment element 12 slidably along an arc of circumference about the rotation axis X of the compression turret 2. The first filling cam 21 is mounted fixed on the first adjustment element 11.

The first adjustment element 11 is slidably fixed to a supporting element 35 of the fixed supporting structure 30 of the tablet press machine 1.

The second adjustment element 12 is configured to be moved with respect to the first adjustment element 11 along a first direction T parallel to the rotation axis X of the compression turret 2. In particular, the second adjustment element 12 is associated with and movably mounted with respect to the first adjustment element 11 along the first direction T. The tablet press machine 1 further comprises first driving means 13 configured to move with respect to the compression turret 2 and along the first direction T simultaneously the first adjustment element 11 supporting the first filling cam 21 and the second adjustment element 12 slidably supporting the second filling cam 22.

The first filling cam 21 is the inner cam, i.e. the closest one to the rotation axis X, and the first channel 25 is therefore made on an outer side wall 21*a* of the first filling cam and open towards the outside of the tablet press machine 1. The second filling cam 22 is the outer cam, i.e. the farthest one from the rotation axis X, and the second channel 26 is therefore made on an inner side wall 22*a* of the second filling cam and open towards the inside of the tablet press machine 1.

The second filling cam 22 is further movable on, and along, the second adjustment element 12, rotating about the rotation axis X at least between a closed position B, in which it is substantially opposite the first filling cam 21 with the first channel 25 facing the second channel 26, and an open position A, in which said second filling cam 22 is positioned angularly spaced from, in particular adjacent to and immediately downstream of, said first filling cam 21, with reference to the rotation direction R. The second filling cam 22 is slidably supported by a supporting plane 12*a* of the second adjustment element 12.

As better explained in the following description, by suitably moving the first adjustment element 11, the second adjustment element 12 and the second filling cam 22 with respect to each other in a plurality of different filling configurations it is possible to vary profile and length of the filling path 27 as desired. Therefore it is possible to vary the position of lower punches 5 in the dies 4, during the rotation of the compression turret 2, and to vary the filling depth of the dosing chambers 40 in the respective dies 4 according to the required specifications, in particular to change the value of the filling depth between a maximum value L1 and a minimum value L4 in an almost continuous manner, i.e. with a very small interval between one value and the next, for example equal to about 0.01 mm.

The first channel 25 of the first filling cam 21 comprises a first upper track 25*a* and a first lower track 25*b*, and the second channel 26 of the second filling cam 22 comprises a second upper track 26*a* and a second lower track 26*b*, said first tracks 25*a*, 25*b* and second tracks 26*a*, 26*b* being configured to abut and guide the follower ends 15 of the lower punches 5. The first channel 25, further comprises a first section 31 and a second section 32.

In the first section 31, the first channel 25 is converging having a width or height, i.e. a distance between the first upper track 25*a* and the first lower track 25*b*, that decreases in the rotation direction R. More precisely, the first channel 25 in the first section 31 has a first inlet height d1 (i.e. an inlet distance between the first upper track 25*a* and the second lower track 25*b*) such as to allow the follower ends 15 to selectively abut the first upper track 25*a* or the first lower track 25*b*, according to the position of the first filling cam 21, i.e. of the first adjustment element 11 along the first direction T, and a first outlet height d2 such as to maintain the follower ends 15 abutting substantially both first tracks 25*a*, 25*b*.

The inlet height d1 of the first channel 25 is bigger than an operating height h of the follower end 15 of the lower punch 5 to allow said follower end 15 to selectively abut the first upper track 25*a* or the first lower track 25*b*.

In the second section 32, positioned downstream of the first section 31 with reference to the rotation direction R, the first channel 25 has a width or height, i.e. a distance between the second upper track 26*a* and the second lower track 26*b*, which is substantially constant and equal to the first outlet height d2 in the first section 31.

The first upper track 25*a* in both sections 31, 32 is substantially straight and sloping towards, i.e. approaching, the first lower track 25*b* according to the rotation direction R of a predefined angle, in particular at the first section 31. The first lower track 25*b* is substantially perpendicular to the rotation axis X, in particular straight and horizontal, at the first section 31, while it is inclined with respect to the rotation axis X and parallel to the first upper track 25*b* at the second section 32.

In the embodiment illustrated in the figures (FIG. 2), the first upper track 25*a* forms an inclination angle α with the supporting plane 12*a* of the second adjustment element 12, for example equal to about 5° (degree).

Likewise, the second channel 26 comprises a further first section 33 and a further second section 34. In the further first section 33 the second channel 26 is converging since has a width or height, i.e. a distance between the second upper track 26*a* and the second lower track 26*b*, decreasing in the rotation direction R. More precisely, in the further first section 33 the second channel 26 has a second inlet height or distance d1' such as to allow the follower ends 15 to selectively abut the second upper track 26*a* or the second lower track 26*b*, according to the angular position of the second filling cam 22 on the second adjustment element 12 and the position of the latter along the first direction T, and a second outlet height or distance d2' such as to maintain the follower ends 15 abutting substantially both second tracks 26*a*, 26*b*. In the further second section 34, positioned downstream of the further first section 33 with reference to the rotation direction R, the second channel 26 has a distance between the second upper track 26*a* and the second lower track 26*b* substantially constant and equal to the second outlet height d2'.

The second upper track 26*a* in both further sections 33, 34 is substantially straight and inclined with a slope towards, i.e. approaching, the second lower track 26*b* according to the rotation direction R, in particular at the further first section 33, and the second lower track 26*b* is substantially perpendicular to the rotation axis X, in particular straight and horizontal, at the further first section 33 while it is inclined with respect to the rotation axis X and parallel to the second upper track 26*a* at the further second section 34.

In the illustrated embodiment, the first upper track 25*a* and the second upper track 26*a* are inclined with respect to the supporting plane 12*a* of the adjustment element 12 of the same inclination angle α.

In the illustrated embodiment the inlet heights or distances d1, d1' and the outlet heights or distances d2, d2' respectively between the first tracks 25*a*, 25*b* of the first channel 25 and between the second tracks 26*a*, 26*b* of the second channel 26 are the same, and the first channel 25 and the second channel 26 are substantially the same and specular with respect to the lower punches, in particular with respect to a cylindrical geometric surface M passing through the longitudinal axes Y of the lower punches 5.

The first driving means 13 are configured to move, with respect to the compression turret 2 and along the first direction T, the first adjustment element 11 (supporting the first filling cam 21 and the second adjustment element 12, which in turn slidably supports the second filling cam 22), in a plurality of positions between a raised position C and a lowered position D.

In the illustrated example, in the raised position C, the first lower track 25*b* of the first channel 25 of the first filling cam 21 is arranged to abut and slidably guide the follower ends 15 of the lower punches 5, and in the lowered position D, the first upper track 25*a* of the first channel 25 of the first filling cam 21 is arranged to abut and slidably guide the follower ends 15. The first driving means 13 are thus capable of moving the first filling cam 21 along a stroke of length S in a plurality of different working positions (FIG. 3A).

The first movement means 13 comprise a first rotary electric motor 45 and first transmission means 41, for example of the screw-nut screw type, actuated by the said first electric motor 45 to linearly move the first adjustment element 11 along the first direction T. The first transmission means 41 comprise a nut screw fixed to the first adjustment element 11 and coupled with, and linearly moved by, a screw rotated by the first rotary electric motor 45. The first adjustment element 11 is also slidably coupled to the supporting element 35 of the fixed supporting structure 30 by means of a pair of rods 44.

The tablet press machine 1 also comprises second driving means 14 configured to move by second transmission means 48 the second adjustment element 12 with respect to said first adjustment element 11 along the first direction T and autonomously with respect to said first adjustment element 11.

Preferably, the second driving means 14 are further configured to move through third transmission means 51, in a coordinated manner with respect to the first filling cam 21, the second filling cam 22 slidably above and along the second adjustment element 12 and in rotation about the rotation axis between the said open position A and said closed position B. In this manner, the second upper track 26*a* of the second channel 26 is held parallel and coplanar to the first upper track 25*a* of the first channel 25. Coplanar means that the upper tracks 25*a*, 26*a* are consecutive and adjacent as well as inclined with respect to the supporting plane 12*a* of the second adjustment element 12 of the same inclination angle α as the upper tracks 25, 26.

The second driving means 14 comprise, for example, a second rotary electric motor 47, the second transmission means 48 and the third transmission means 51 being actuated by the second electric motor 47 respectively to linearly move the second adjustment element 12 along the first direction T and to move the second filling cam 22 on the first adjustment element 12 along an arc of circumference whose centre is on the rotation axis X.

The second transmission means 48 are, for example, of the screw-nut screw type and comprise respectively a nut screw fixed to the second adjustment element 12 and coupled with, and linearly moved by, a respective screw rotated by the second rotary electric motor 47 through an extendable cardan joint 49.

The third transmission means 51 comprise, for example, a toothed sector that is made on the second filling cam 22, in particular on an outer side wall thereof that is opposite the inner side wall 22*a*, and engages, i.e. is in mesh, with a pinion 52 rotated by the second rotary electric motor 47 of the second driving means 14. The gear ratio between toothed sector and pinion 52 and transmission ratio between screw-nut screw of the second transmission means 48 are such as to allow the second filling cam 22 to be moved between the open position A and the closed position B while always maintaining the second upper track 26*a* parallel and coplanar to the first upper track 25*a* of the first filling cam 21.

With particular reference to FIG. 3A, the follower end 15 of each lower punch 5 comprises a shaped annular protrusion, in particular having said operating height h, provided with opposite annular abutment faces 15*a*, 15*b* arranged to abut slidably the upper tracks 25*a*, 26*a* and/or the lower tracks 25*b*, 26*b* of the first and second channel 25, 26. The annular faces are inclined with respect to a longitudinal axis Y of the lower punch 5 of the same inclination angle as the sliding surfaces of the upper 25*a*, 26*a* and lower 25*b*, 26*b* tracks. The operating height h is the distance along the longitudinal axis Y between the upper and lower edges of the annular abutment faces 15*a*, 15*b*.

In a variant of the tablet press machine 1 of the invention not illustrated, the follower end 15 of each lower punch 5 comprises a pair of opposite rotating rollers with respect to the longitudinal axis Y and arranged to abut the upper tracks 25*a*, 26*a* and/or the lower tracks 25*b*, 26*b* of the first and second channel 25, 26.

The tablet press machine 1 further comprises a fixed inlet cam 9 positioned upstream of the first filling cam 21 with reference to the rotation direction R and provided with an inlet track 28 adapted to support and slidably guide the follower ends 15 of the lower punches 5 at the inlet of the dosing station 7 towards the first channel 25 of the first filling cam 21. The inlet path 28 has a substantially linear and horizontal profile.

The second adjustment element 12 comprises an outlet track 29 adapted to support and slidably guide the follower ends 15 of the lower punches 5 exiting the second filling cam 22. To this end, the follower ends 15 of the lower punches 5 comprise respective base faces 15*c* arranged to abut the inlet and outlet tracks 28, 29.

It should be noted that a filling distance F between the upper surfaces of the inlet track 28 and the outlet track 29 respectively, is the filling stroke of the lower punches 5 to form dosing chambers 40 in the dies 4 having the desired filling depth.

Referring to FIGS. 2 to 14 in an initial adjustment step of the tablet press machine 1 of the invention, it is provided the adjustment of cam means 10 to set the filling distance F, i.e. the stroke of the lower punches 5, so as to obtain dosing chambers 40 in the dies 4 having an settled and desired filling depth.

More precisely, the first filling cam 21 and the second filling cam are positioned with respect to each other so that the first channel 25 and the second channel 26 form a filling profile or channel 27 having a length and profile such as to carry out the required displacement of the lower punches 5 to obtain the required filling depth.

To this end, the first adjustment element 11 supporting both filling cams 21, 22 is moved with respect to the compression turret 2 by the first driving means 13 along the first direction T and arranged at a fixed position between the possible positions comprised between the raised position C and the lowered position D. At the same time, the second adjustment element 12 and the second filling cam 22 are moved with respect to the first filling cam 21 by the second driving means 14 in a coordinated manner respectively along the first direction T and along the second adjustment element 12 and about the rotation axis X of the compression turret 2, so as to position the second filling cam 22 at a respective settled position among the possible positions comprised between the open position A and the closed position B. Several combinations of the relative positions between the filling cams 21, 22 and the positions of filling cams, i.e. of the first adjustment element 11, with respect to the compression turret 2 can be used to achieve a same filling distance F or filling depth.

FIGS. 2-14 illustrate some filling configurations of the cam means 10 obtained by combining the relative positions of the filling cams 21, 22 arranged in the respective end positions, i.e., in the raised positions C and lowered positions D for the first filling cam 21 and in the open and closed positions A, B for the second filling cam 22.

FIGS. 1 to 6 illustrate a configuration of maximum filling C1 of cam means 10 which allows to obtain the maximum filling depth L1 of the dosing chamber 40. In such a configuration of maximum filling C1, the first filling cam 21 fixed and moved by the first adjustment element 11 is arranged in the lowered position D and the second filling cam 22, slidably supported by the second adjustment element 12, is arranged in the open position A, creating a filling profile 27 having a maximum length.

In the configuration of maximum filling C1 the follower ends 15 of the lower punches 5 during the rotation of the compression turret 2 abut and are slidably guided by the upper tracks 25*a*, 26*a*, in particular at the respective first sections 31, 33 of the channels 25, 26 of the filling cams 21, 22. The filling distance F between the sliding surfaces of the inlet track 28 and the outlet track 29 is equal to the maximum filling depth L1.

Figure 8:
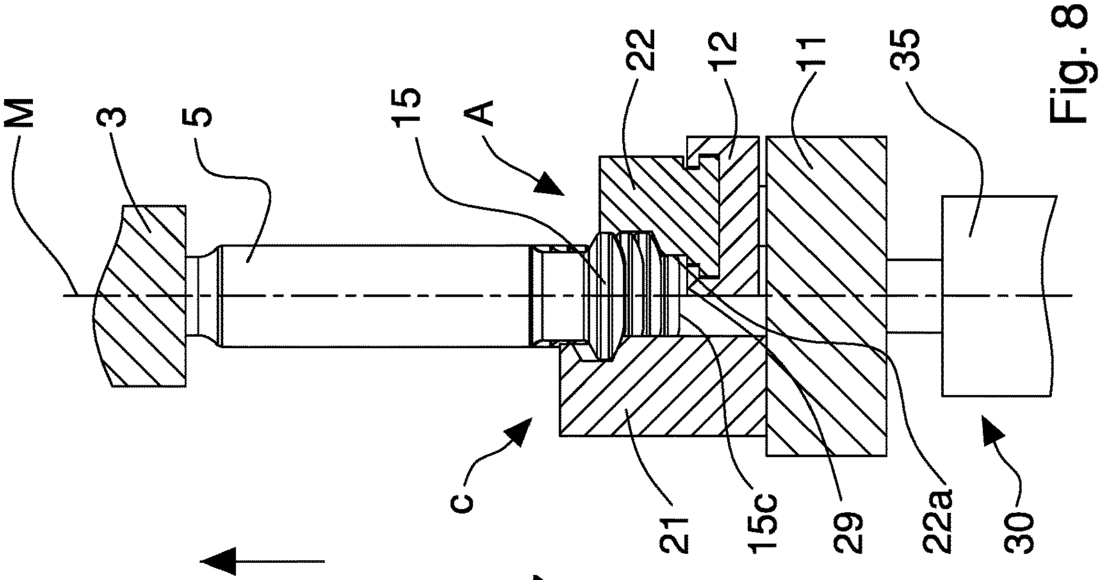
FIG. 8 is a section according to the plane VIII-VIII of FIG. 7.
Figure 7:
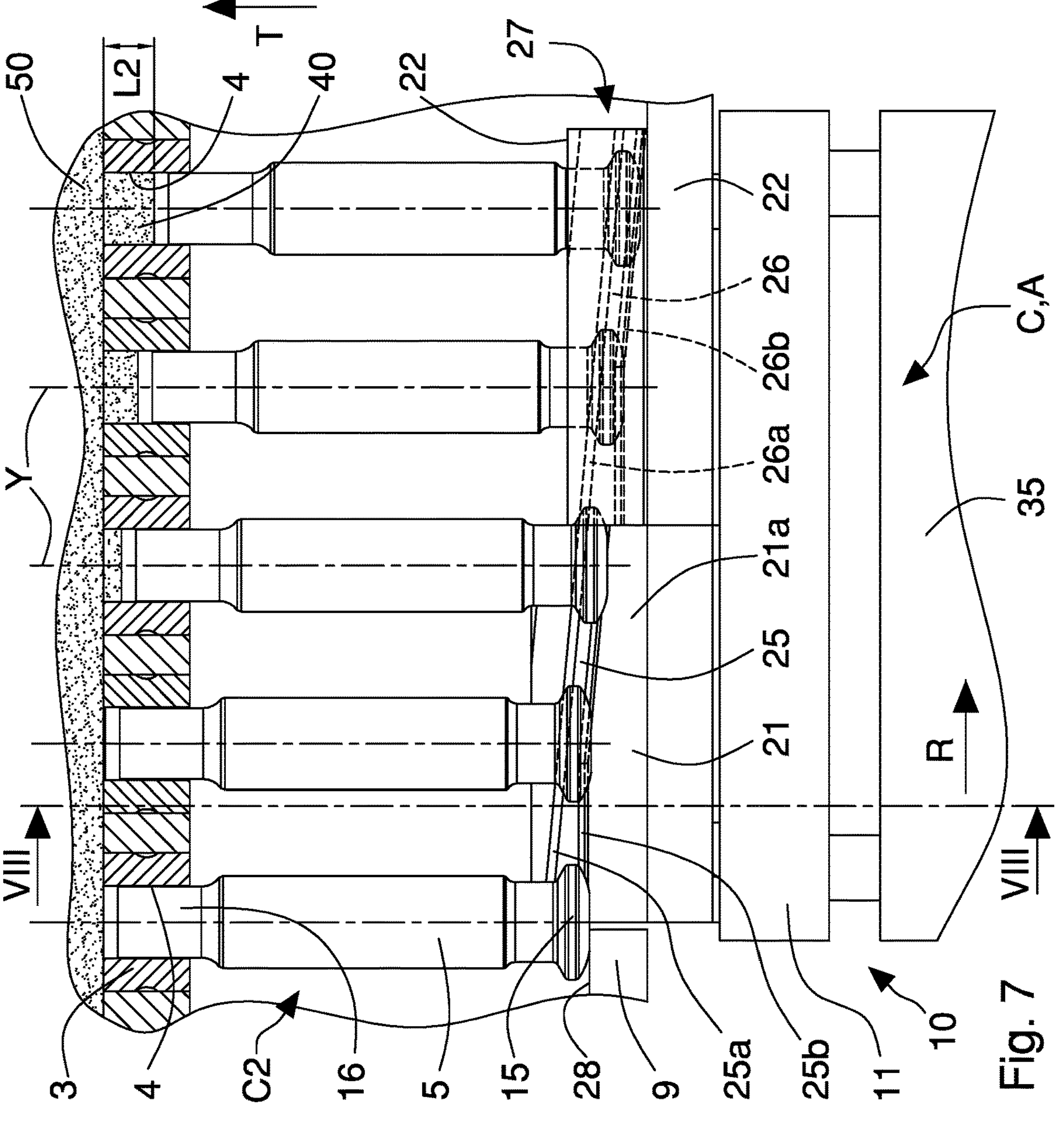
FIG. 7 is a view similar to that of FIG. 2 that shows the lower punches and the cam means in a first configuration of intermediate filling.
Figure 10:
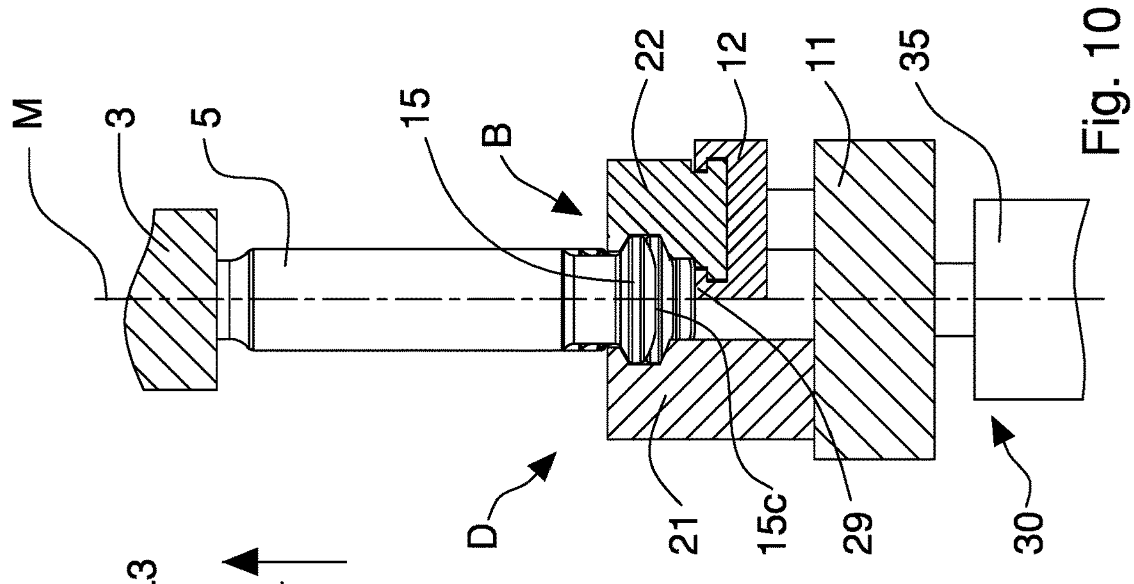
FIG. 10 is a section according to the plane X-X of FIG. 9.
Figure 9:
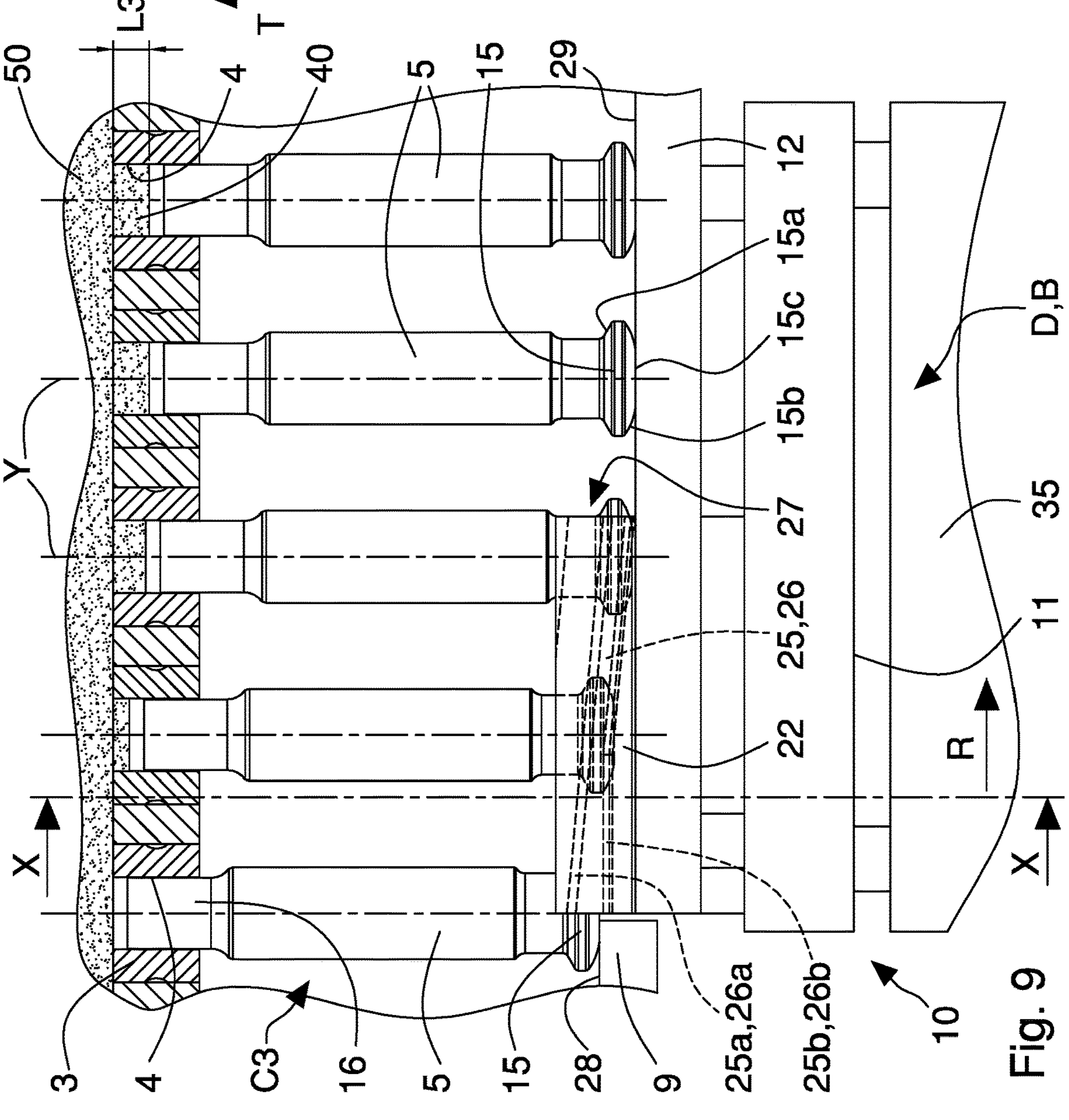
FIG. 9 is a view similar to that of FIG. 2 which shows the lower punches and the cam means in a second configuration of intermediate filling.
Figure 12:
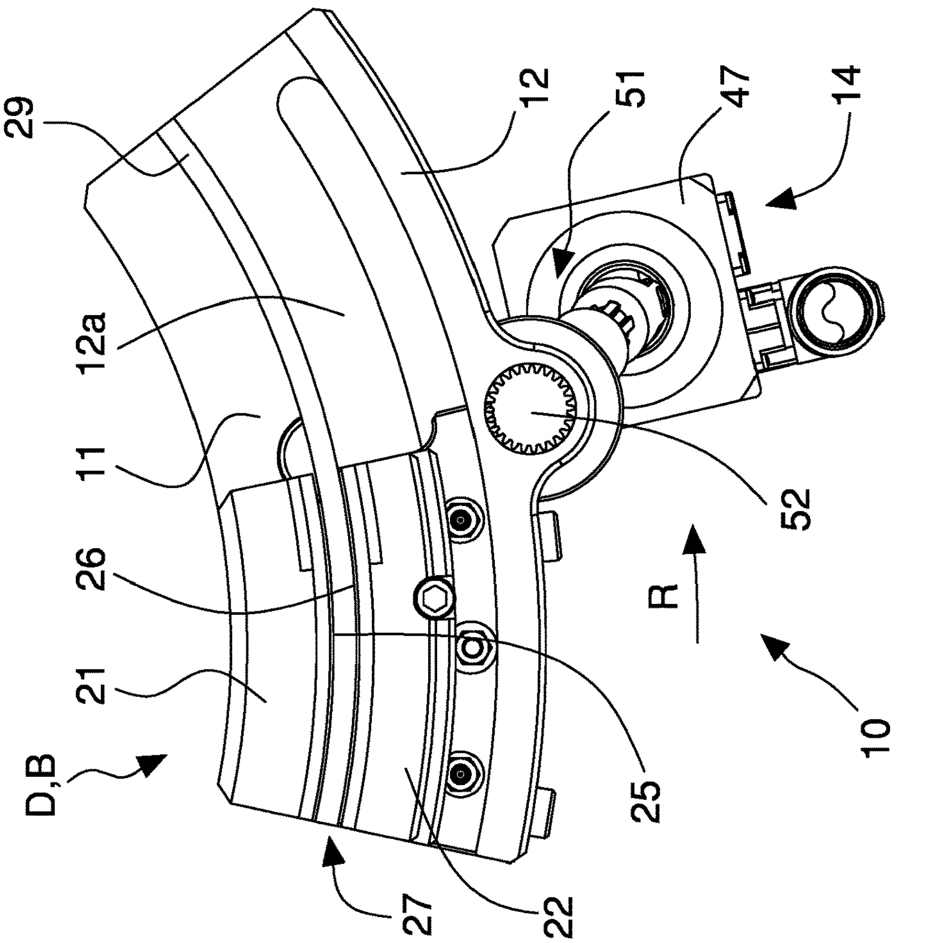
FIG. 12 is a plan view of the cam means of FIG. 11.
Figure 11:
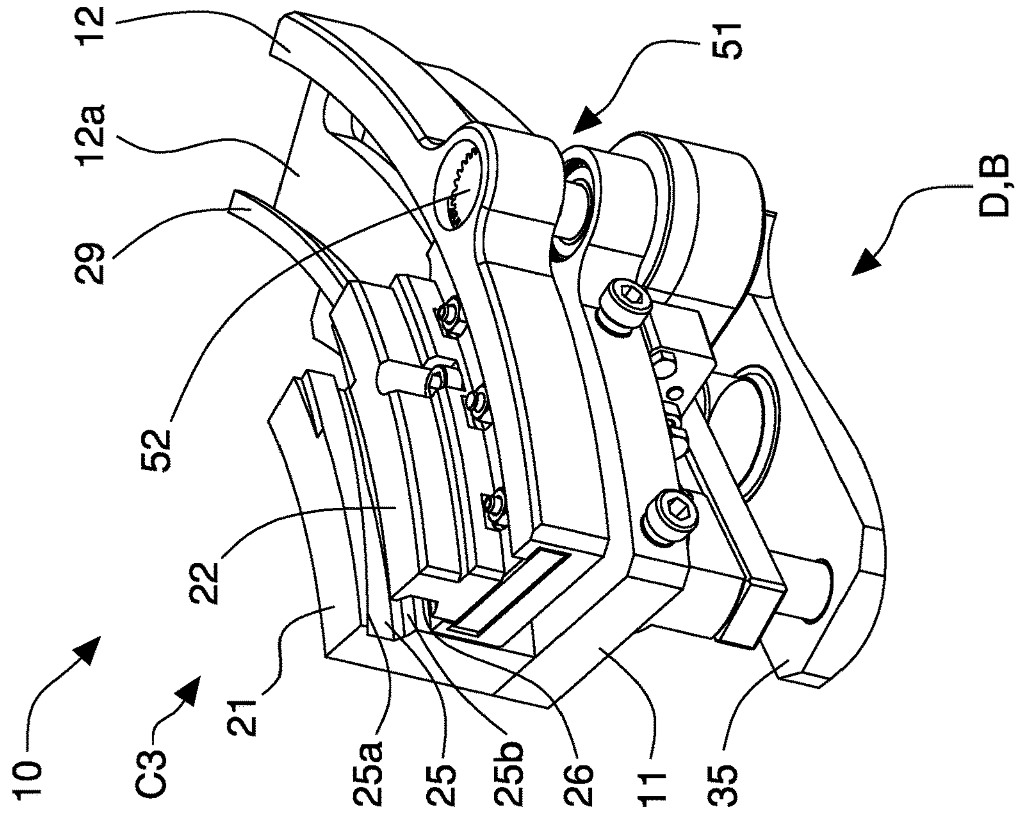
FIG. 11 is an enlarged and interrupted perspective view of the cam means in the second configuration of intermediate filling.

FIGS. 7 and 8 illustrate a first configuration of intermediate filling C2 of cam means 10 which allow to obtain a first intermediate filling depth L2 of the dosing chamber 40. In such a first configuration of intermediate filling C2, the first filling cam 21 is arranged in the raised position C and the second filling cam 22 is held in the open position A, creating a filling channel 27 having maximum length.

In the first configuration of intermediate filling C2 the follower ends 15 of the lower punches 5 during the rotation of the compression turret 2 in the first section 31 of the first channel 25 of the first filling cam 21 abut and are slidably guided by the first lower tracks 25*b*, while in the further first section 33 of the second channel 26 of the second filling cam 22 they abut and are guided by the second upper track 26*a*.

The filling distance F between the sliding surfaces of the inlet track 28 and the outlet track 29 is equal to the first intermediate filling depth L2.

FIGS. 9 to 12 illustrate a second configuration of intermediate filling C3 of cam means 10 which allows to obtain a second intermediate filling depth L3 of the dosing chamber 40, smaller than the first intermediate filling depth L2. In such a second configuration of intermediate filling C3, the first filling cam 21 is arranged in the lowered position D and the second filling cam 22 is arranged in the closed position B, creating a filling channel 27 having a minimum length.

In this second configuration of intermediate filling C3 the second channel 26 of the second filling cam 22 is facing in a substantially specular way the first channel 25 of the first filling cam 21 and the follower ends 15 of the lower punches 5 during the rotation of the compression turret 2 in the first sections 31, 33 of the channels 25, 26 of the filling cams 21, 22 abut and are slidably guided by both upper tracks 25*a*, 26*a*.

The filling distance F between the upper sliding surfaces of the inlet track 28 and the outlet track 29 is equal to the second intermediate filling depth L3.

Figures 13, 14:
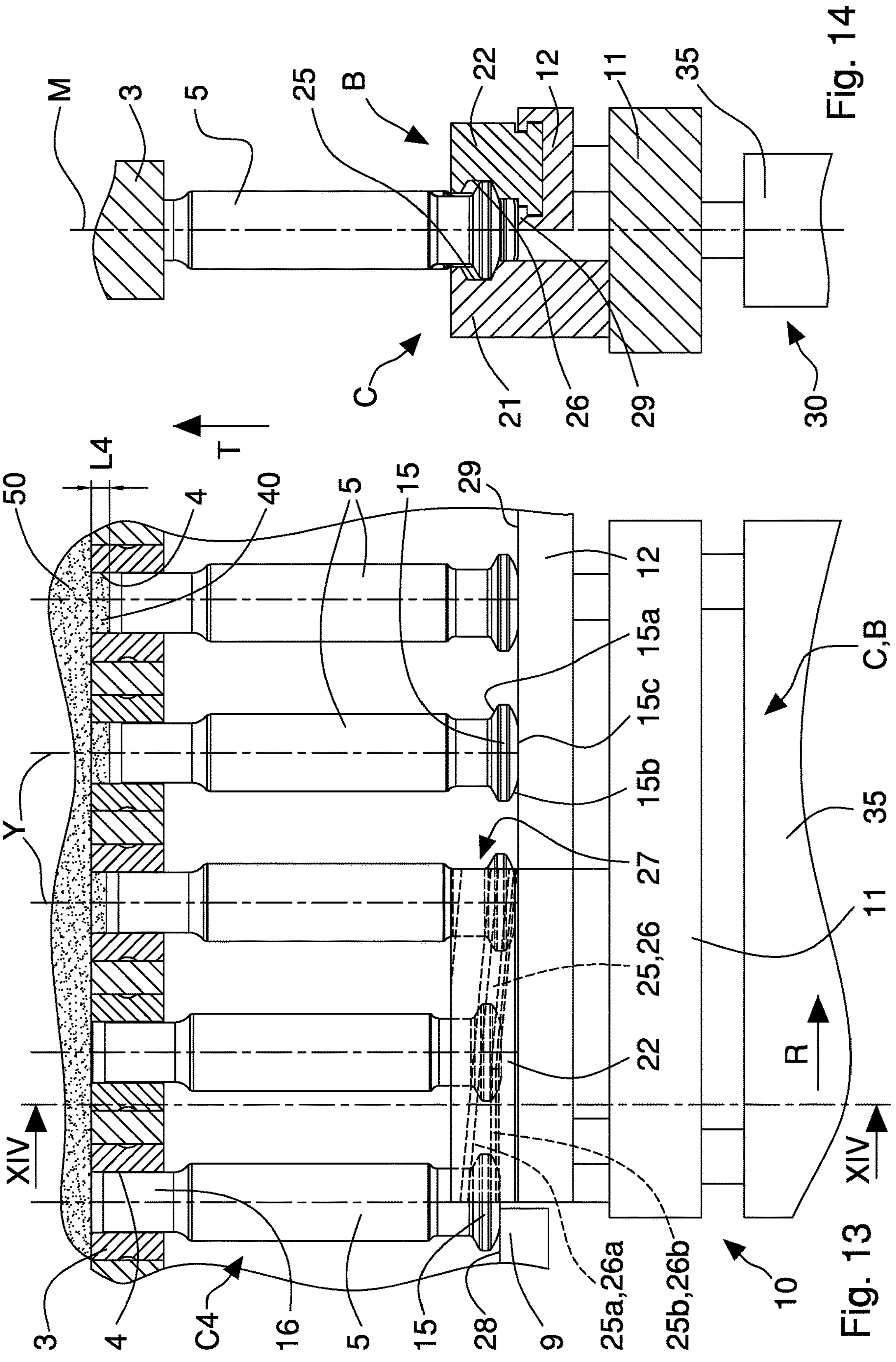
FIG. 13 is a view similar to that of FIG. 2 which shows the lower punches and the cam means in a configuration of minimum filling.
FIG. 14 is a section according to the plane XIV-XIV of FIG. 14.

FIGS. 13 and 14 illustrate a configuration of minimum filling C4 of cam means 10 which allows to obtain the minimum filling depth L4 of the dosing chamber 40. In such a configuration of minimum filling C4, the first filling cam 21 is arranged in the raised position C and the second filling cam 22 is arranged in the closed position B, creating a filling channel 27 having a minimum length.

In the configuration of minimum filling C4 the second channel 26 of the second filling cam 22 is facing in a substantially specular way the first channel 25 of the first filling cam 21 and the follower ends 15 of the lower punches 5 during the rotation of the compression turret 2 in the first sections 31, 33 of the channels 25, 26 of the respective filling cams 21, 22 abut and are slidably guided by the lower tracks 25*b*, 26*b*.

The filling distance F between the sliding surfaces of the inlet track 28 and the outlet track 29 is equal to the minimum filling depth L4.

As already highlighted above, by suitably moving the first adjustment element 11, i.e. the first filling cam 21 with respect to the compression turret 2 along the adjustment direction T, and the second filling cam 22 parallel and about the rotation axis X with respect to the first filling cam 21, it is possible to rapidly, simply and precisely obtain a plurality of different configurations of filling comprised between the configuration of maximum filling C1 and the configuration of minimum filling C4, i.e. it is possible to vary and adjust the filling depth from the maximum value L1 to the minimum value L2 in an almost continuous manner, with a minimum interval, for example equal to about 0.01 mm between one value and the next. Such an adjustment can be performed accurately and quickly by the driving means 13, 14 comprising two rotary electric motors 45, 47 controllable in rotation and speed with precision.

The range of values between the maximum value L1 and the minimum value L2 may be, for example, about 14 mm, considering, for example, a maximum filling depth value L1 of 20 mm and a minimum filling depth value of 6 mm. This range of 14 mm can be obtained in traditional rotary filling machines by replacing the filling cam and necessarily using a suitable adjustment cam positioned downstream of the filling cam to obtain intermediate and/or more precise adjustments of the volume of dosing chamber 40. The adjustment cam allows to modify, in particular to reduce, the volume of dosing chambers 40, to bring the volume to the desired value, by suitably raising the lower punches 5 so as to allow the removal of the excess product.

Thanks to cam means 10 of tablet press machine 1 of the invention, which allow a precise and accurate adjustment of the volume of dosing chambers 40 obtained in the dies 4 with the lower punches 5, it is not necessary to include a subsequent downstream adjustment cam in order to reduce the volume of dosing chambers 40, this making it possible to simplify the structure of the tablet press machine 1.

Moreover, since it is not necessary to replace the filling cams 21, 22 in order to vary the filling depth within the settled range of values L1-L4, the stopping times of the filling machine 1 of the invention are minimal, also due to the easy and fast adjustment of the position of filling cams 21, 22 by the driving means 13, 14.

The invention claimed is:

1. A rotary tablet press machine comprising:

a compression turret configured to rotate with a rotation direction about a rotation axis and including a die table, said die table having a plurality of dies provided along a circumferential portion thereof, a plurality of lower punches and a corresponding plurality of upper punches associated in pairs with respective dies;

a dosing station comprising a filling arrangement for filling, with a product, dosing cavities that are formed by said dies closed at a bottom by said lower punches and having a settled filling depth; and a cam assembly cooperating with said lower punches for moving said lower punches inside said respective dies and obtaining the settled filling depth, wherein said cam assembly comprises a first filling cam provided with a first channel and a second filling cam provided with a second channel, said first channel and said second channel being configured and mutually arranged to guide follower ends of said lower punches along a filling path;

a first adjustment element supporting said first filling cam and a second adjustment element supporting said second filling cam, which is mounted on said second adjustment element slidably along an arc of circumference about the rotation axis, said second adjustment element being configured to be moved with respect to said first adjustment element along a first direction parallel to the rotation axis; and a first driving system configured to move, with respect to said compression turret and along the first direction simultaneously, said first adjustment element supporting said first filling cam and said second adjustment element slidably supporting said second filling cam.

2. The tablet press machine according to claim 1, wherein said second filling cam is movable at least between a closed position, in which said second filling cam is substantially opposite said first filling cam with said first channel facing said second channel, and an open position, in which said second filling cam is positioned angularly spaced from said first filling cam.

3. The tablet press machine according to claim 1, wherein said first channel at an end thereof for entry of said lower punches has an inlet height larger than an operating height of said follower ends of said lower punches.

4. The tablet press machine according to claim 1, wherein said first channel comprises a first upper track and a first lower track and said second channel comprises a second upper track and a second lower track, said first upper and lower tracks and said second upper and lower tracks being configured to abut said follower ends of said lower punches.

5. The tablet press machine according to claim 4, wherein said first channel further comprises a first section and a second section, said first channel in said first section is convergent, and has a distance between said first upper and lower tracks decreasing in the rotation direction, with an inlet height of said first channel such as to allow said follower ends to abut said first upper track or said first lower track and an outlet height of said first channel such as to maintain said follower ends abutting almost both said first upper and lower tracks, and said first channel in said second section, which is located downstream of said first section with respect to the rotation direction, has a distance between said first upper and lower tracks that is substantially constant and equal to the outlet height.

6. The tablet press machine according to claim 5, wherein said first upper track is substantially straight and inclined with slope towards said first lower track according to the rotation direction, and said first lower track is substantially perpendicular to the rotation axis in said first section and is inclined with respect to the rotation axis and parallel to said first upper track in said second section.

7. The tablet press machine according to claim 4, wherein said second channel further comprises a further first section and a further second section, said second channel in said further first section is convergent, has a distance between said second upper and lower tracks decreasing in the rotation direction with a further inlet height of said second channel such as to allow said follower ends to abut said second upper track or said second lower track and a further outlet height of said second channel such as to keep said follower ends abutting almost both said second upper and lower tracks, and said second channel in said further second section, which is located downstream of said further first section with respect to the rotation direction, has a distance between said second upper and lower tracks substantially constant and equal to the further output height.

8. The tablet press machine according to claim 7, wherein said second upper track is substantially straight and inclined with slope towards said second lower track according to the rotation direction, and said second lower track is substantially perpendicular to the rotation axis in said further first section and is inclined with respect to the rotation axis and parallel to said second upper track in said further second section.

9. The tablet press machine according to claim 4, wherein said first upper track and said second upper track are inclined with respect to a supporting plane of said second adjustment element of a same inclination angle.

10. The tablet press machine according to claim 1, further comprising a second driving system configured to move by way of a second transmission assembly said second adjustment element with respect to said first adjustment element along the first direction.

11. The tablet press machine according to claim 10, wherein said second driving system is further configured to move by way of a third transmission assembly, in a coordinated manner with respect to said first filling cam, said second filling cam slidably on said second adjustment element.

12. The tablet press machine according to claim 11, wherein said third transmission assembly comprises a toothed sector made on said second filling cam and a pinion engaging with said toothed sector, said pinion being rotated by said second driving system.

13. The tablet press machine according to claim 1, wherein said first filling cam is mounted fixed on said first adjustment element.

14. The tablet press machine according to claim 1, wherein said second adjustment element comprises an outlet track adapted to support and slidably guide said follower ends of said lower punches exiting said second filling cam and having a substantially linear and horizontal profile, a filling distance between upper sliding surfaces of an inlet track located upstream of said first filling cam and said outlet track coinciding with a stroke of said lower punches along the first direction to form said dosing cavities in said dies having the settled filling depth.

15. The tablet press machine according to claim 1, wherein said follower end of each lower punch comprises a shaped annular protrusion provided with opposite annular abutting faces arranged to slidably abut said first and second channels.

* * * * *